(12) United States Patent
Roessingh et al.

(10) Patent No.: US 7,775,128 B2
(45) Date of Patent: Aug. 17, 2010

(54) CASSETTE-BASED POWER METER

(75) Inventors: Jordan R. Roessingh, Madison, WI (US); David L. Wendt, Janesville, WI (US)

(73) Assignee: Saris Cycling Group, Inc., Madison, WI (US)

( * ) Notice: Subject to any disclaimer, the term of this patent is extended or adjusted under 35 U.S.C. 154(b) by 0 days.

(21) Appl. No.: 12/204,578

(22) Filed: Sep. 4, 2008

(65) Prior Publication Data

US 2010/0050785 A1    Mar. 4, 2010

(51) Int. Cl.
*G01L 3/10*    (2006.01)
(52) U.S. Cl. ............................ 73/862.191
(58) Field of Classification Search ............ 73/862.191
See application file for complete search history.

(56) References Cited

U.S. PATENT DOCUMENTS

| | | | |
|---|---|---|---|
| 3,845,663 A | 11/1974 | Blomberg et al. | |
| 4,141,248 A | 2/1979 | Bargenda | |
| 4,423,630 A | 1/1984 | Morrison | |
| 4,463,433 A | 7/1984 | Hull et al. | |
| 4,625,551 A | 12/1986 | Carnielli | |
| 4,630,818 A | 12/1986 | Saarinen | |
| 4,785,674 A | 11/1988 | Orman et al. | |
| 4,811,612 A | 3/1989 | Mercat | |
| 4,966,380 A * | 10/1990 | Mercat | 280/259 |
| 5,016,478 A | 5/1991 | Mercat | |
| 5,027,303 A | 6/1991 | Witte | |
| 5,031,455 A | 7/1991 | Cline | |
| 5,065,633 A | 11/1991 | Mercat | |
| 5,154,677 A | 10/1992 | Ito | |
| 5,202,627 A | 4/1993 | Sale | |
| 5,257,540 A | 11/1993 | Bower et al. | |
| 5,314,366 A | 5/1994 | Palm | |
| 5,324,238 A | 6/1994 | Karp | |
| 5,591,908 A | 1/1997 | Reid | |
| 5,816,599 A | 10/1998 | Soejima et al. | |
| 6,138,520 A | 10/2000 | Chang | |
| 6,199,021 B1 | 3/2001 | Cote et al. | |
| 6,263,992 B1 | 7/2001 | Li | |
| 6,418,797 B1 * | 7/2002 | Ambrosina et al. | 73/862.29 |
| 6,439,067 B1 | 8/2002 | Goldman et al. | |
| 6,701,793 B2 | 3/2004 | Wallin et al. | |
| 6,886,416 B2 | 5/2005 | Tsay et al. | |

(Continued)

FOREIGN PATENT DOCUMENTS

DE    3722728    12/1988

(Continued)

*Primary Examiner*—Lisa M Caputo
*Assistant Examiner*—Freddie Kirkland, III
(74) *Attorney, Agent, or Firm*—Boyle Fredrickson, S.C.

(57) ABSTRACT

A cassette-based power measuring apparatus includes a power sensing arrangement mounted within a cavity defined by a hollow bicycle cassette. The power sensing arrangement includes a torque sensing assembly including torque sensing elements configured to measure a user applied torque. The torque sensing elements are in communication with an electronics assembly configured to process the measured data and transmit it to a receiver. The torque sensing assembly may comprise a torque tube or a series of bending beams secured between a rear plate of the cassette and a freehub. The torque tube or bending beams may include strain gauges bonded thereto for measuring strain induced by application of forces in response to user-applied power.

22 Claims, 6 Drawing Sheets

U.S. PATENT DOCUMENTS

| | | |
|---|---|---|
| 6,959,612 B2 | 11/2005 | May |
| 7,047,817 B2 | 5/2006 | Lanham |
| 7,061,228 B2 | 6/2006 | Ichida et al. |
| 2001/0030408 A1 | 10/2001 | Miyoshi |
| 2003/0024310 A1 | 2/2003 | Montagnon |
| 2003/0094783 A1 | 5/2003 | Miyoshi |
| 2003/0094784 A1 | 5/2003 | Miyoshi |
| 2003/0132600 A1 | 7/2003 | Miyoshi |
| 2003/0132601 A1 | 7/2003 | Miyoshi |
| 2003/0132602 A1 | 7/2003 | Miyoshi |
| 2004/0035225 A1 | 2/2004 | Crasset |
| 2004/0113608 A1 | 6/2004 | Ichida et al. |
| 2004/0237666 A1 | 12/2004 | Winkenbach et al. |
| 2005/0043915 A1 | 2/2005 | Ueda |
| 2005/0080545 A1 | 4/2005 | Takagi |
| 2005/0160835 A1 | 7/2005 | Masaki et al. |
| 2005/0195094 A1 | 9/2005 | White |
| 2005/0199075 A1 | 9/2005 | Tokoro et al. |
| 2005/0275561 A1* | 12/2005 | Kolda et al. ............ 340/870.07 |
| 2006/0095191 A1 | 5/2006 | Lin |
| 2006/0108183 A1 | 5/2006 | Watarai |
| 2006/0248965 A1 | 11/2006 | Wyatt et al. |

FOREIGN PATENT DOCUMENTS

| | | |
|---|---|---|
| EP | 0386005 | 7/1988 |
| WO | WO 89/00401 | 1/1989 |
| WO | WO 01/30643 | 5/2001 |

* cited by examiner

CASSETTE-BASED POWER METER

BACKGROUND AND SUMMARY OF THE INVENTION

The present invention relates to a power measuring device for use with a bicycle or other device that is powered by user operation of a pedal assembly and more particularly, to a power meter disposed within the cassette of a rear wheel assembly of a bicycle that measures the torque placed on the rear wheel assembly to determine the amount of power exerted by the user during operation of the pedal assembly.

Bicycles, stationary trainers and fixed spinner bikes outfitted with a device used to sense or detect torque and/or power are generally known. One exemplary power meter is the POWERTAP, commercially available from Saris Cycling Group, Inc. of Madison, Wis. Another representative power meter is described in U.S. Pat. No. 6,418,797 to Ambrosina et al., the disclosure of which is incorporated herein by reference. The power meter described in the '797 patent is designed to measure the torque applied to the rear hub of the cycle. The applied torque measurements together with angular velocity measurements are then used to calculate power in a manner understood by those in the art and thus provide an indication of the work exerted by a user to pedal the bicycle, trainer, etc.

To measure the torque applied to the rear hub or rear wheel assembly of the bicycle, a torque coupling member is typically mounted to the rear hub or forms part of the rear hub itself. Strain gauges or other torque sensing devices are mounted to the rear hub and in communication with the torque coupling member such that any torque experienced by the torque coupling member is detected by the strain gauges. The output of the strain gauges is then fed to a processing device that together with angular velocity information, calculates power information that can be displayed suitably to the user together with other information, such as speed, distance traveled, etc.

Electronics for the measurement of the strain, torque, power and angular velocity measurements are generally mounted in the rear hub assembly as well. The electronics include a battery for powering the electronics as well as circuitry configured to process, amplify, and convert the associated data. A radio frequency (RF) transmitter or the like is provided for transmitting the collected data to a receiver for further processing, which is typically mounted to the handlebars of the bicycle.

One of the drawbacks of conventional hub-based power meters is that it is difficult and time consuming to remove and install the torque sensing components, thereby limiting a user's ability to transfer the power meter between bicycles. That is, for a user to utilize the power meter with more than one bicycle or wheel, the user must disassemble the entire wheel including the spokes and hub. As it is common for bicyclists to utilize different types of bicycles for different types of races, events, or training environments, a great deal of time may be consumed by having to disassemble the wheel structure of one wheel such that the hub assembly incorporating the torque sensor may be used with another bicycle. Further, it can be cost-prohibitive to outfit each bicycle with a power meter when only one bicycle is being used at a time. In addition, it is difficult for a manufacturer of a hub-based power meter to provide a power meter that can be used with all or a majority of the various rear wheel configurations that are available.

The present invention is generally directed to an apparatus and method for measuring torque and/or power in a driven wheel of a pedal operated device such as a bicycle. In one representative embodiment, the invention includes a torque sensing device positioned within a hollow rear cassette. The torque sensing element may include a tube having at least one strain gauge positioned thereon. Alternatively, the torque sensing element may include a bending beam configured to detect the torque applied to the freehub of the bicycle The torque may be measured by a force sensing device connected to the bending beam or, in one alternate embodiment, disposed between a pair of orthogonally arranged bending beams.

The torque sensing elements are in communication with electronics configured to process the collected torque data for calculation of the power being applied by the user. A transmitter such as a RF transmitter may be provided in communication therewith to transmit the data in real-time to a receiver. The electronics and transmitter are preferably contained in the hollow portion of the rear cassette.

It is therefore an object of the present invention to provide a torque sensing device that is selectively interchangeable from bike-to-bike and/or wheel-to-wheel. It is yet another object of the present invention to provide a device powered by user operation of a pedal assembly that includes a torque sensing device that is relatively lightweight. It is yet another object of the present invention to provide a cost effective torque sensing system.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF PREFERRED EMBODIMENTS

Figure 1:
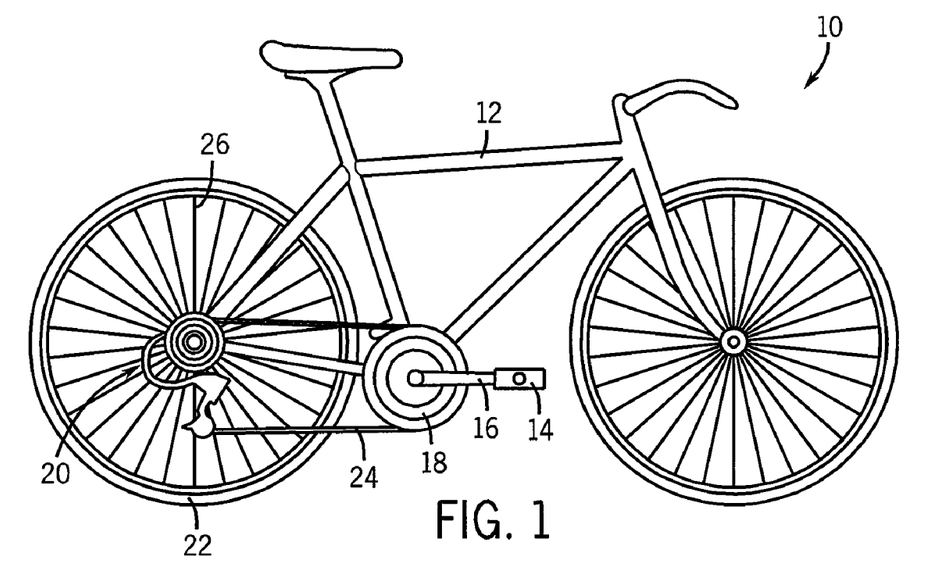
FIG. 1 is a side elevation view of a bicycle incorporating a rear cassette-based power meter of the present invention.

Turning now to the drawings, and initially to FIG. 1, a bicycle 10 equipped with a power sensing arrangement of the present invention is shown. The bicycle 10 includes a frame 12 that rotatably supports a pair of pedals 14 connected by crank arms 16 to a chain ring 18. The chain ring 18 is coupled to the hub 20 of the rear wheel 22 by a chain 24. The bicycle 10 is powered by a cyclist providing rotational forces to the chain ring 18 via the pedals 12 and crank arms 14. The rotation of the chain ring 18 is transferred by the chain 24 to the rear wheel hub 20, which carries the rear wheel 22 into rotation via spokes 26 to drive the bicycle 10 into motion.

Figure 2:
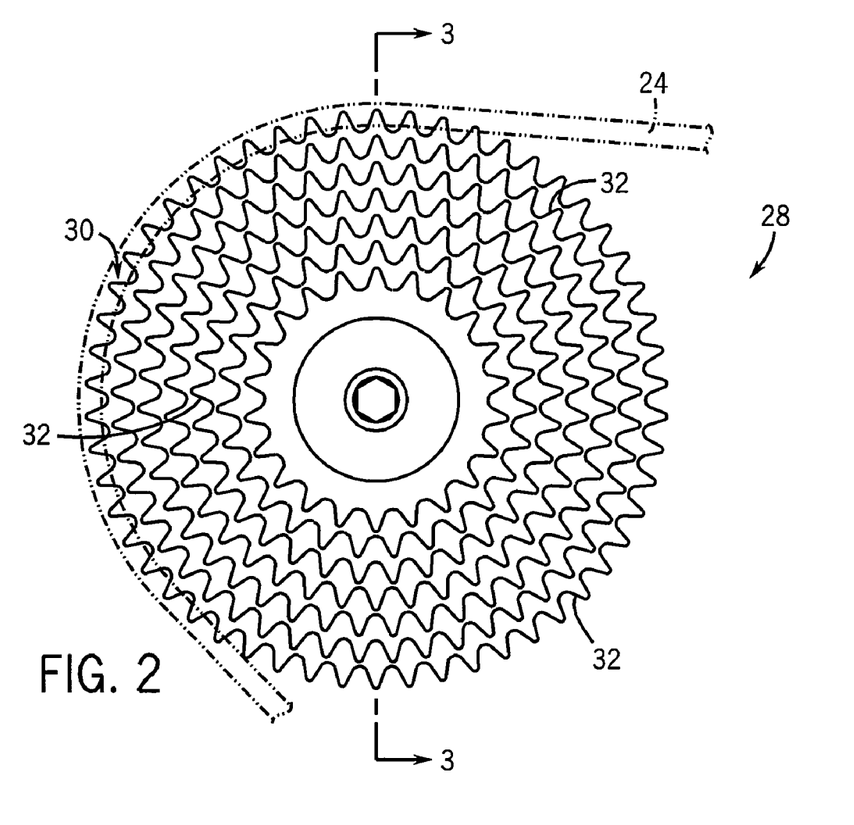
FIG. 2 is a side elevation view of the rear cassette.

Referring now to FIG. 2, the bicycle further includes a cassette 28 that is engaged with the chain 24 and attached to the rear hub 20 of the bicycle 10 in a known manner and includes a cogset 30 centrally disposed about a rear axle (not numbered) of the bicycle 10. The cogset 30 includes multiple sets of gear teeth 32 extending from a single gear ring 34 but concentrically oriented with respect to one another.

Figure 3:
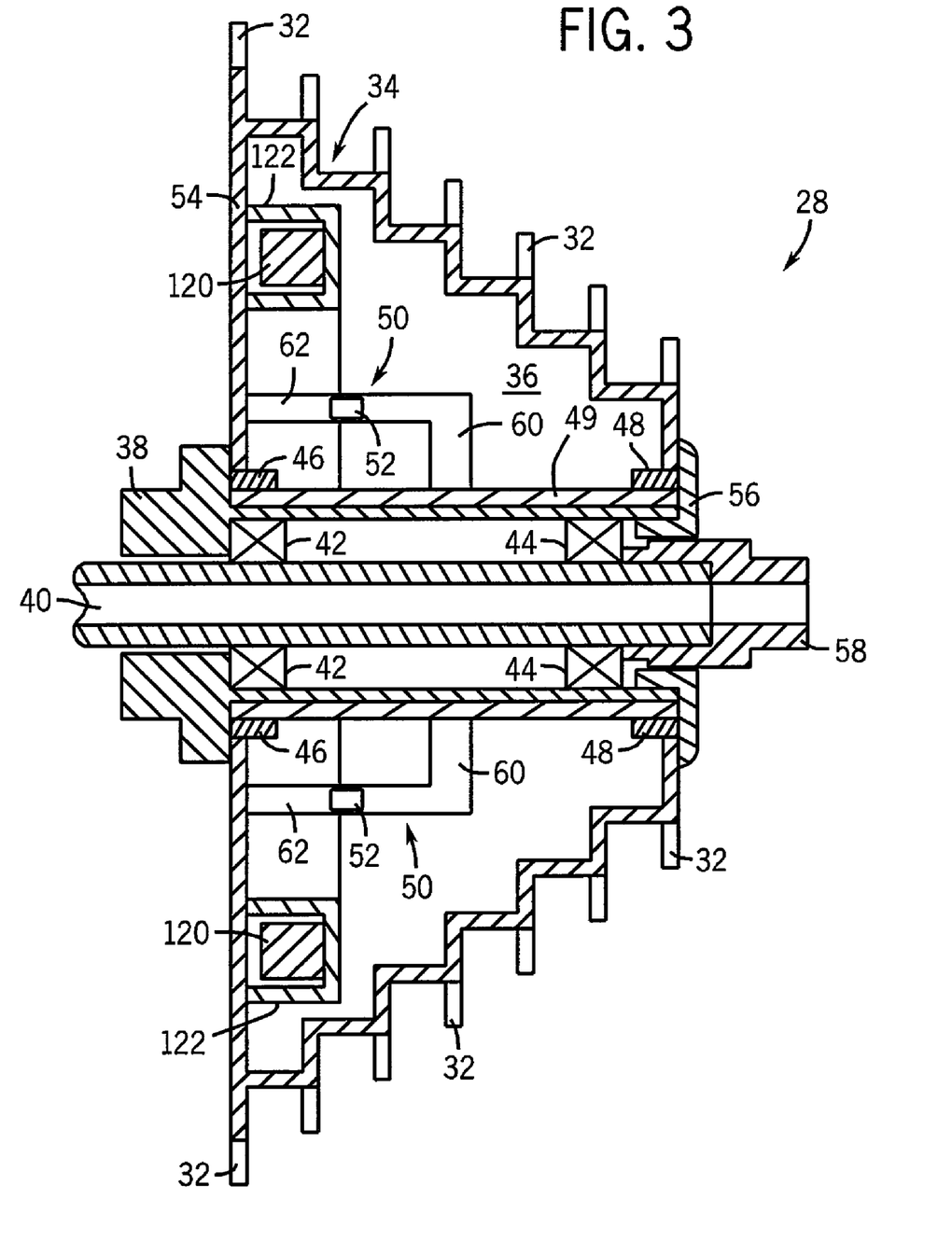
FIG. 3 is a cross section of the rear cassette of FIG. 2 taken along lines 3-3.

With additional reference to FIG. 3, the single gear ring 34 has a generally staircase profile with gear teeth 32 extending from each "step" of the ladder-like structure. In this regard, the cassette 28 provides various sets of gears in a manner similar to conventional cassettes but does so without the need for separate gear rings for each set of gear teeth. This construction provides the cassette 28 with a hollow internal cavity or interior 36 that can be used to mount torque sensing components and associated electronics within the cassette 28, as will be described more fully below.

As noted above, the cassette 28 is mounted to the rear hub 20 in a known manner. In this regard, the bicycle 10 includes a freehub 38 through which the rear axle 40 of the bicycle 10 extends. The freehub 38 is coupled to the axle 40 via a pair of bearings 42 and 44 that allow rotation between the freehub 38 and the axle 40. The cassette 28 is isolated from the freehub 38 by isolation bushings 46 and 48 and a sleeve 49. The cassette 28 is thus coupled to the freehub 38 through a series of bending beams 50 and sleeve 49. The cassette 28 includes a back plate 54 having an opening (not numbered) defined therein for sliding the cassette 28 over the sleeve 49 which is splined to the freehub 38. The bending beams 50 are interconnected between the sleeve 49 and the back plate 50. In one representative embodiment, the bending beams 50 are connected via splined sleeve 49 to the freehub 38, although it is understood that other types of torque transferring connections may be used. As will be explained in greater detail below, each bending beam 50 includes one or more torque sensing elements 52, e.g., strain gauges, to sense the torque placed on the free hub 38 as the cyclist pedals the bicycle 10.

A lock ring 56 or similar retainer may be used to secure the cassette 28 to the freehub 38 to limit linear movement of the cassette 28 along the body of the freehub 38. The axle 40 is secured in place by way of a nut 58. As known in the art, a spindle (not shown) may be inserted through the axle 40 and a locking cap (not shown) may be used to secure the aforementioned components to the rear fork of the bicycle 10.

Figure 4:
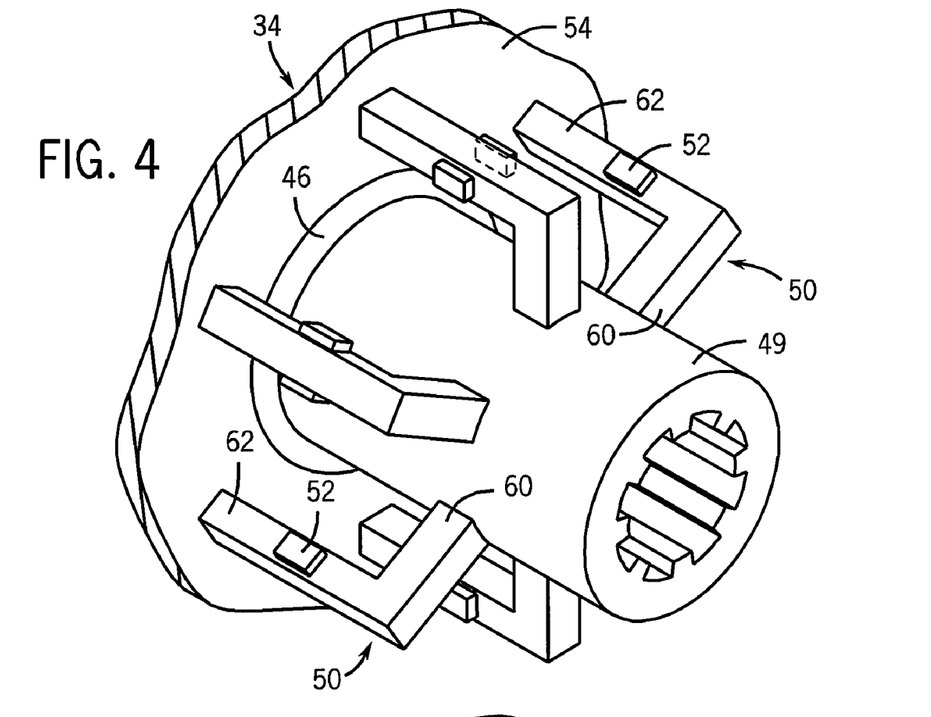
FIG. 4 is a partial isometric view of the rear cassette of FIG. 2 incorporating a torque sensing element according to one embodiment of the present invention.

With additional reference to FIG. 4, each bending beam 50 includes a radially extending leg 60 that is coupled to the sleeve 49 and an axially extending header 62 extending laterally from the leg and connected to the back plate 54. In a preferred embodiment, a torque sensing element 52 is carried on opposing sides of each header 62. The torque sensing elements 52 are preferably bonded to the bending beams 50 using an adhesive or similar known fastening mechanism.

Accordingly, in operation, rotational forces applied to the cassette 28 are transmitted to the rear plate 54 and transmitted directly to the bending beams 50. The bending beams 50 deform in response to the applied torque, and the torque sensing elements 52 detect the deformation experienced by the bending beams 50. Corresponding signals associated with the bending strain in the beams 50 are derived from the torque sensing elements 52, and are then processed by electronics operably coupled to the torque sensing elements 52. Further, the processed data may then be transmitted by way of a transmitter such as an RF transmitter to a receiver as is generally understood in the art for subsequent processing and calculation of various parameters, such as power.

Figure 5:
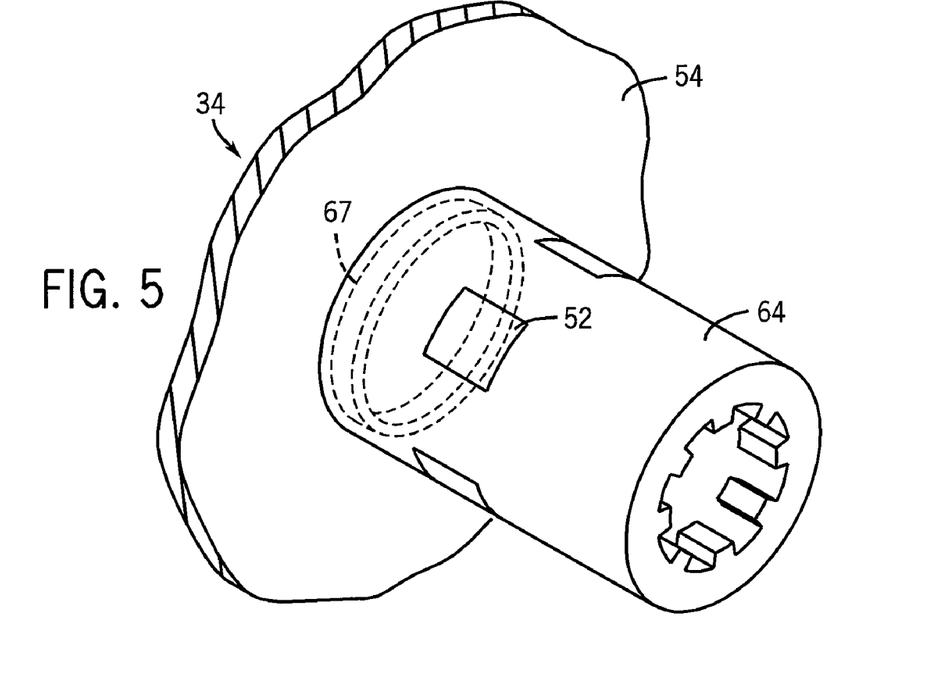
FIG. 5 is a partial isometric view of a rear cassette incorporating a torque sensing element according to another embodiment of the present invention.
Figure 6:
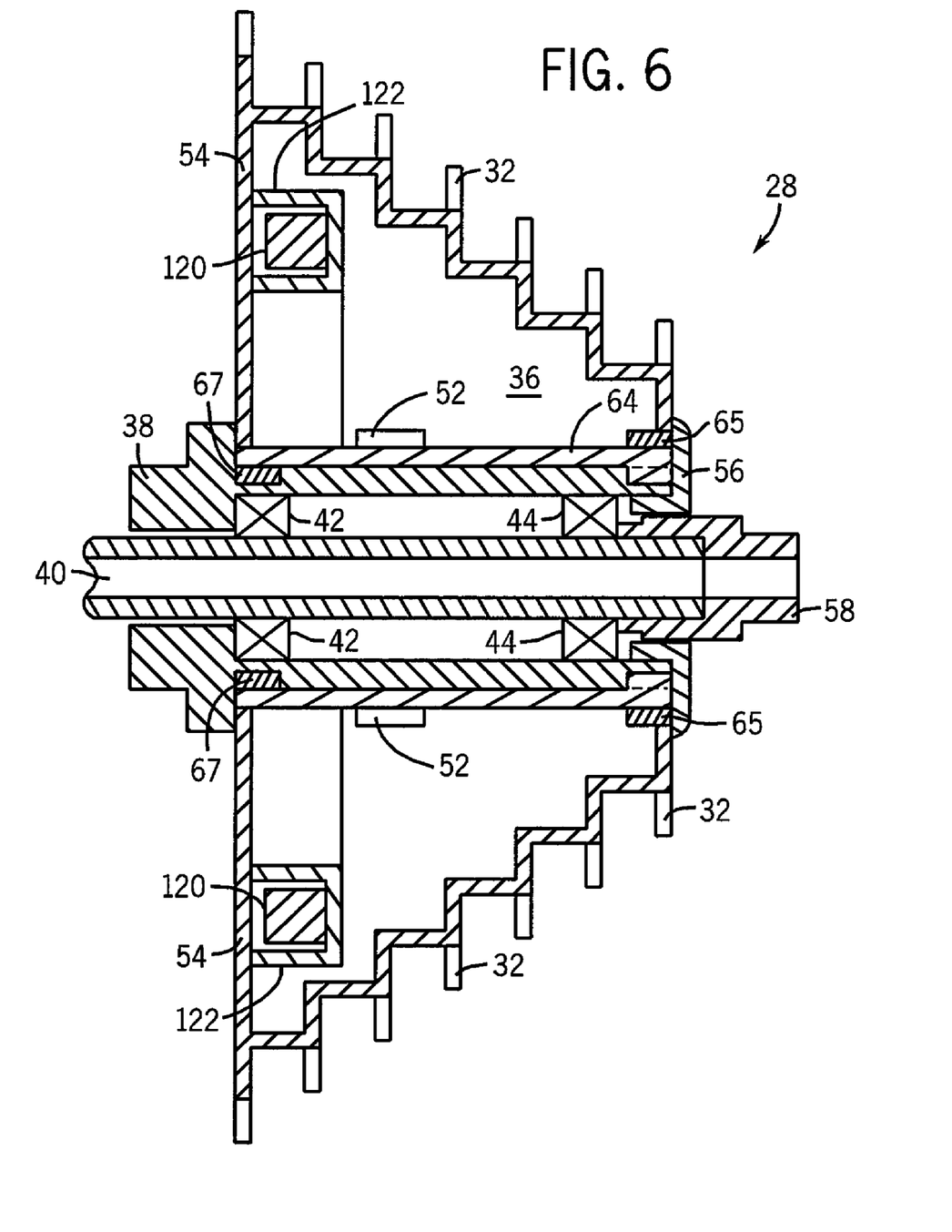
FIG. 6 is a section view of that shown in FIG. 5.

Turning now to FIGS. 5 and 6, in accordance with another embodiment of the invention, the torque sensing elements 52 are mounted to a tube 64 that fits over the freehub 38. In this embodiment, the end of the inner surface of the tube 64 is splined to engage the splines of the freehub 38. The freehub 38 is isolated from the rear plate 54 of the cassette 28 in a manner similar to that described above, but is coupled to the cassette 28 through the tube 64 which is coupled directly to the rear plate 54. Thus, with reference to FIG. 6, the "left side" of tube 64 is solidly connected to the rear plate 54 of the hollow cassette 28 and the "right side" of the hollow cassette 28 is isolated from the tube 64 by an isolation bushing 65. The "left side" of the tube 64 is isolated from the freehub 38 by bushing 67. In one embodiment, the tube 64 may be coupled to the rear plate 54 by welding or by a series of rivets or studs (not shown), but is understood that other connections may be used. In operation, the torque applied to the cassette 28 is transmitted from the back plate 54 to the freehub 38 through the tube 64. The torque is sensed by the torque sensing elements 52, which sense torsional strain experienced by tube 64 in the transfer of power from back plate 54 to the freehub 38. The sensed strain signals are then processed by electronics mounted in the cassette 28 and transmitted to a receiver for further processing.

Figure 7:
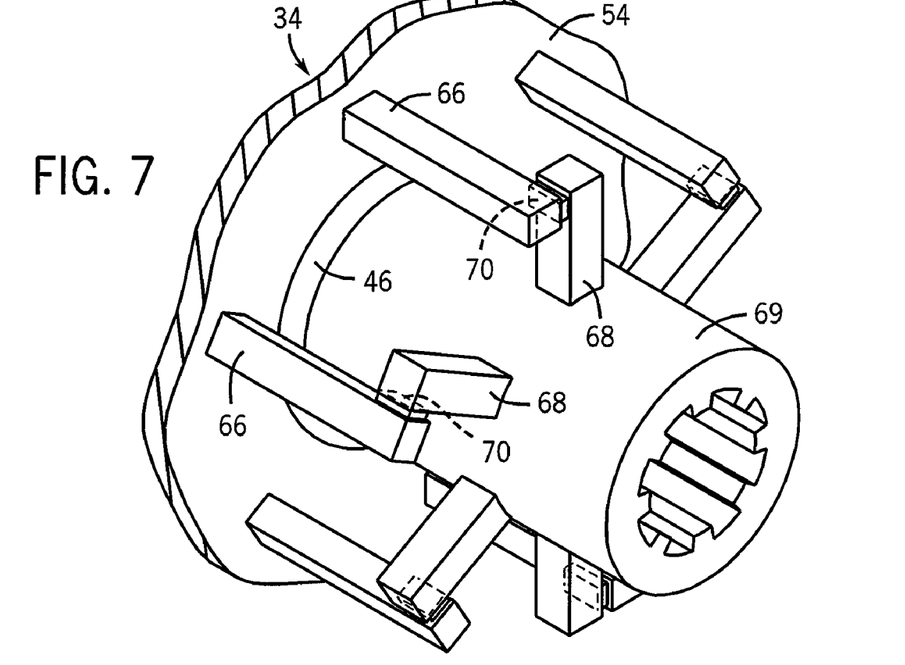
FIG. 7 is a partial isometric view of a rear cassette incorporating a torque sensing element according to yet another embodiment of the present invention.

FIG. 7 illustrates yet another manner in which the torque applied by a cyclist can be measured to assess the amount of power the cyclist is exerting to propel the bicycle. In this embodiment, a series of interconnected torque transmission beam elements 66 and 68 are connected to the rear plate 54 and the freehub 38. More particularly, each axial beam element 66 is coupled to the rear plate 54 and extends from the rear plate 54 along an axis generally parallel to the longitudinal axis of the freehub 38. Each radial beam element 68 is secured to the a sleeve 69 which is connected to the freehub 32 and is oriented orthogonal to one of the axial beam elements 66. A torque sensing element 70 is positioned between each axial beam element 66 and its corresponding radial beam element 68.

In this embodiment of the present invention, torque sensing element 70 includes a compressive force sensor adapted for detecting a compressive force between the beam elements 66, 68. Accordingly, in operation, as the torque is transmitted through the cassette rear plate 54 to the freehub 38 through the beam elements 66, 68, the torque sensing elements 70 measure a compressive force experienced between the beam elements 66, 68. The measured compressive force may then be processed by electronics housed within the cassette 28 and transmitted to a receiver as described previously.

Figure 8:
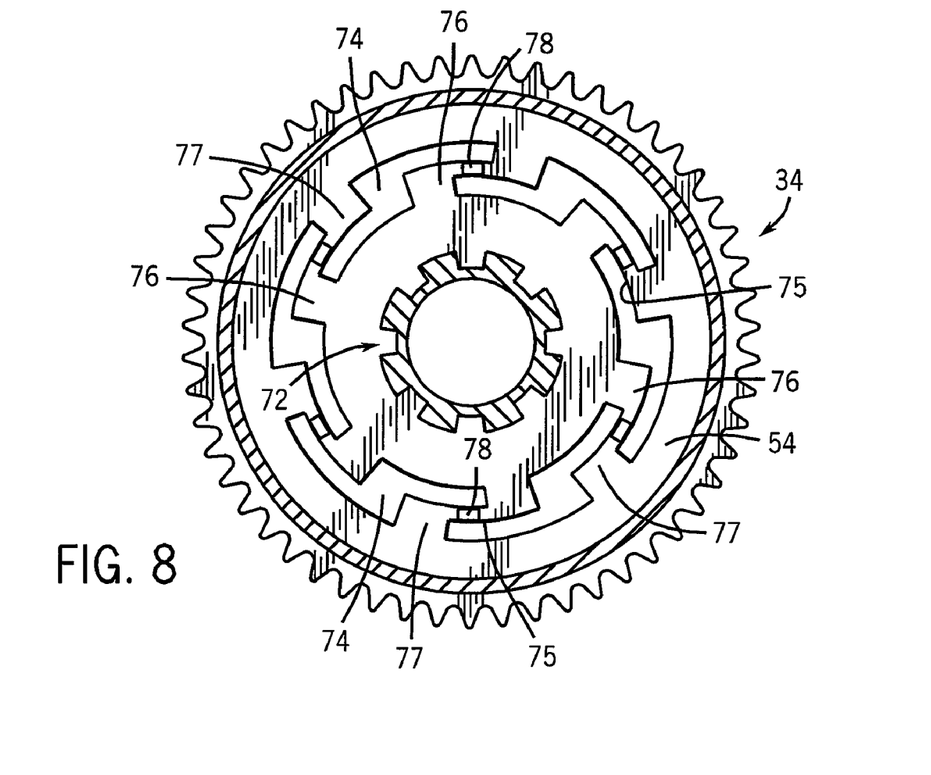
FIG. 8 is a side elevation view of a hollow cassette back plate incorporating a torque sensing arrangement according to a further embodiment of the present invention.

Referring now to FIG. 8, in accordance with another embodiment of the present invention, the rear plate 54 of the cassette 28 includes splines 72 adapted to receive corresponding members of the freehub 38. In the illustrated embodiment, the rear plate 54 includes a series of somewhat Z-shaped openings 74 within the area of the rear plate 54. The openings 74 are constructed such that consecutive adjacent openings 74 have portions that overlap but are separated from one another by a narrowed neck section 75. The inner portions of the rear plate 54 defined by openings 74, generally designated by reference numeral 76, and the outer portions of the rear plate 64 defined by openings 74, generally designated by reference numeral 77, are interconnected by the neck sections 75 which function to transmit torque from the outer area of the rear plate 54 to the inner area of the rear plate 64. A torque sensing element 78 is bonded to each of the neck sections 75. The torque sensing elements 78 are preferably strain gauges, which function to sense strain in the neck sections 75 resulting from bending forces applied to the neck sections 75. In operation, the torque experienced by the torque transmission structural elements 76 is sensed by torque sensing elements 78, processed by electronics housed in the cassette and transmitted to a receiver as discussed previously.

Figure 9A:
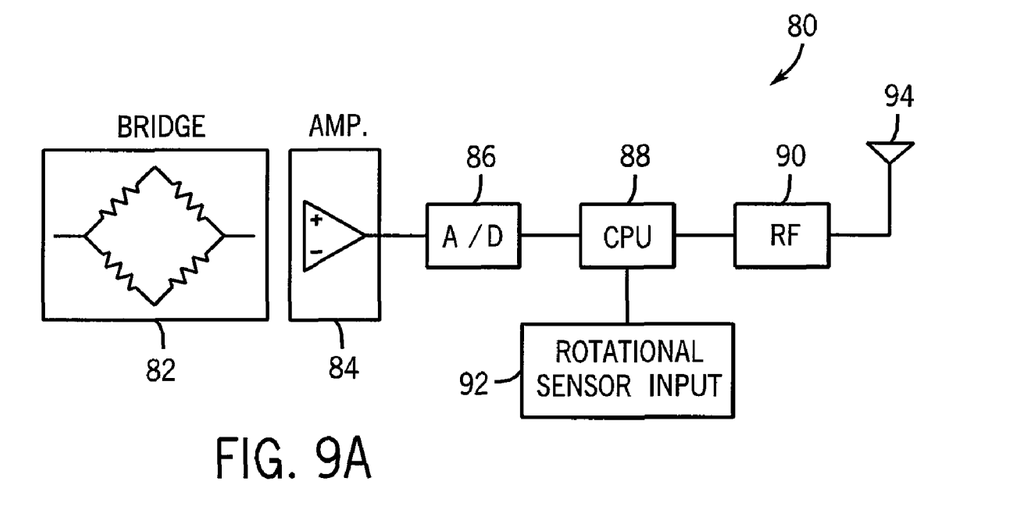
FIG. 9A is a schematic representation of an electronics arrangement of the power meter of the present invention.

Referring now to FIG. 9A, an electronics assembly 80 for measuring the torque applied by the cyclist in accordance with one embodiment of the present invention is shown. Referring initially to FIG. 9A, the electronics assembly 80 includes a Wheatstone bridge 82 in communication with an amplifier 84 for amplifying the signal measured by the bridge 84. One skilled in the art will appreciate that a strain gauge such as those shown and described above can be schematically represented by a Wheatstone bridge. An A/D converter 86 is included for conversion of the analog signal detected by the bridge 82 to a digital signal. A CPU 88 is provided and receives data from a rotational sensor 90 that detects rotation of the rear or front wheel of the bicycle as known in the art. The CPU 88 receives the torque measurement as detected by Wheatstone bridge 82 together with angular velocity information from the sensor 90 to determine the amount of power applied by the cyclist. The calculated values may then be transmitted by way of a RF transmitter 92 to an antenna 94 or receiver so that the corresponding performance values and those derived therefrom may be recorded and/or displayed to the user as known in the art. It is understood that the CPU may calculate or otherwise derive additional performance values from the torque and/or angular measurements referenced above. For example, the CPU may calculate bicycle speed, cadence, distance traveled, and time of ride as well as average values, such as average power, average speed, and the like.

Figure 9B:
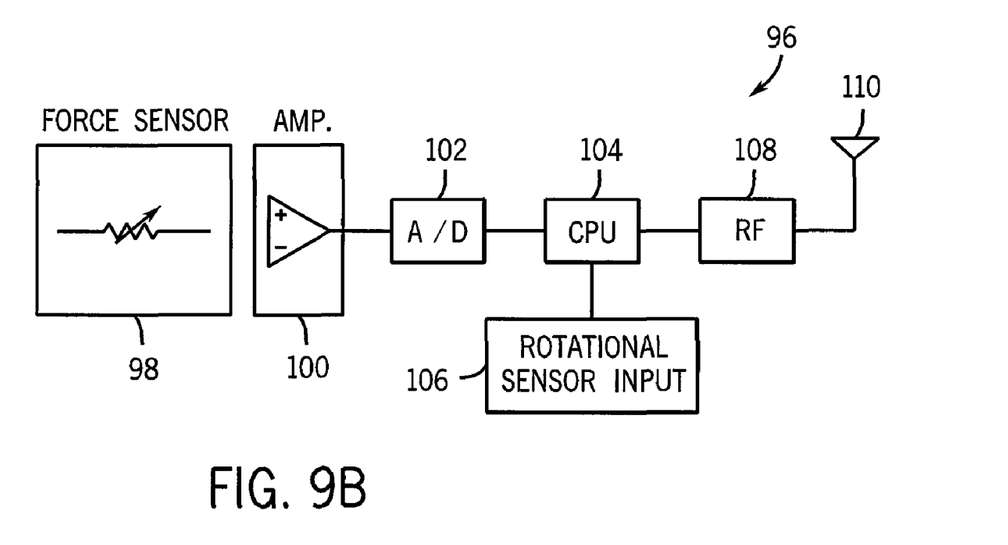
FIG. 9B is a schematic representation of an alternative electronics arrangement of the power meter of the present invention.

FIG. 9B illustrates another embodiment of an electronics assembly 96 of the present invention. Electronics assembly 96 is substantially similar to electronic assembly 80 described above; however, in this embodiment, a force sensor 98 is used for measuring the force applied by the user rather than a Wheatstone bridge. Components 100 through 110 are similar to components 84 through 94 described above.

Referring again to FIG. 1, the electronic components indicated in FIGS. 9A and 9B may be configured to fit within the internal cavity 36 of the cassette 28. Representatively, the electronic components may be carried by a suitable component carrier 120 that is contained within a housing 122 configured to be received and mounted within the internal cavity 36. The component carrier 120 and housing 122 may be in the shape of a ring that is interconnected with the rear plate 54, although it is understood that such components may have any desired configuration and may be secured in any satisfactory location within the internal cavity 36 of the cassette 28.

Additionally, it should be understood that the CPU may be positioned in the hollow portion of the cassette, but it is understood that the CPU could be mounted elsewhere on the bicycle, e.g., handlebars, and the output of the torque sensing elements and the velocity sensor could be transmitted via a wired or wireless communication to the CPU.

The present invention has been described in terms of the preferred embodiment, and it is recognized that equivalents, alternatives, and modifications, aside from those expressly stated, are possible and within the scope of the appending claims.

What is claimed is:

1. A bicycle comprising:
a frame;
a pair of wheels including a driven wheel mounted to the frame;
a rotatable pedal assembly mounted to the frame;
a chain drive associated with the rotatable pedal assembly and configured to cause rotation of the driven wheel in response to rotation of the rotatable pedal assembly;
a drive gear arrangement drivingly interconnected with the driven wheel and driven by the chain drive during operation of the rotatable pedal assembly, wherein the drive gear arrangement includes an internal cavity; and
a torque sensing arrangement positioned within the internal cavity of the drive gear arrangement for measuring torque applied by a user to the drive gear arrangement through the chain drive and the pedal assembly;
wherein the drive gear arrangement comprises a hollow cassette defining the internal cavity, wherein the torque sensing arrangement is positioned within the internal cavity of the hollow cassette, and wherein the hollow cassette includes a series of concentric external gears.

2. The bicycle of claim 1, further comprising a hub assembly mounted within the driven wheel and including a freehub, wherein the hollow cassette is secured to the freehub.

3. The bicycle of claim 2 wherein the torque sensing arrangement is secured between the cassette and the freehub.

4. The bicycle of claim 3, wherein the torque sensing arrangement comprises a torque measurement assembly including at least one torque sensing element mounted between the cassette and the freehub.

5. The bicycle of claim 4, wherein the torque sensing arrangement includes a tubular member mounted to the freehub and connected to the cassette, and further includes a strain gauge coupled to the tubular member.

6. The bicycle of claim 1, wherein the torque sensing arrangement includes an electronics assembly configured to process signals provided thereto from a torque sensing element.

7. The bicycle of claim 1, wherein the hollow cassette includes a series of concentric external gears and a rear plate, and wherein a portion of the torque sensing arrangement is secured to the rear plate of the hollow cassette.

8. The bicycle of claim 7, wherein the torque sensing arrangement comprises a plurality of torque sensing elements mounted to the rear plate.

9. The bicycle of claim 8, wherein the torque sensing elements comprise a plurality of strain gauges.

10. A bicycle comprising:
a frame;
a pair of wheels including a driven wheel mounted to the frame wherein a hub assembly is carried by the driven wheel and includes a freehub;
a rotatable pedal assembly mounted to the frame;
a chain drive associated with the rotatable pedal assembly and configured to cause rotation of the driven wheel in response to rotation of the rotatable pedal assembly;
a drive gear arrangement drivingly interconnected with the driven wheel and driven by the chain drive during operation of the rotatable pedal assembly, wherein the drive gear arrangement comprises a hollow cassette secured to the freehub, wherein the hollow cassette defines an internal cavity, and wherein the hollow cassette includes a series of concentric external gears; and
a torque sensing arrangement positioned within the internal cavity of the hollow cassette for measuring torque applied by a user to the drive gear arrangement through the chain drive and the pedal assembly, wherein the torque sensing arrangement is secured between the cassette and the freehub and includes at least one torque sensing element, wherein the torque sensing arrangement comprises at least one torque transmission bending beam secured between the freehub and a rear plate defined by the cassette.

11. The bicycle of claim 10, wherein the torque sensing element comprises a strain gauge bonded to the torque transmission bending beam.

12. A bicycle comprising:
a frame;
a pair of wheels including a driven wheel mounted to the frame wherein a hub assembly is carried by the driven wheel and includes a freehub;
a rotatable pedal assembly mounted to the frame;
a chain drive associated with the rotatable pedal assembly and configured to cause rotation of the driven wheel in response to rotation of the rotatable pedal assembly;
a drive gear arrangement drivingly interconnected with the driven wheel and driven by the chain drive during operation of the rotatable pedal assembly, wherein the drive gear arrangement comprises a hollow cassette secured to the freehub, wherein the hollow cassette defines an internal cavity, and wherein the hollow cassette includes a series of concentric external gears; and
a torque sensing arrangement positioned within the internal cavity of the hollow cassette for measuring torque applied by a user to the drive gear arrangement through the chain drive and the pedal assembly, wherein the torque sensing arrangement is secured between the cassette and the freehub and includes at least one torque sensing element, wherein the torque sensing arrangement comprises a pair of orthogonally coupled torque transmission beams, wherein a first torque transmission beam is secured to a rear plate of the cassette and a second torque transmission beam is secured to the freehub.

13. The bicycle of claim 12, wherein the torque sensing element comprises a compressive force sensing element secured between the first torque transmission beam and the second torque transmission beam.

14. A power sensing assembly for use with an apparatus powered by a user applied force to a pedal assembly for driving a wheel of the apparatus, wherein the wheel includes a hub, the power sensing assembly comprising:
a gear arrangement secured to the hub and drivingly interconnected with the pedal assembly, wherein the gear arrangement includes a body defining an internal cavity;
a torque sensing assembly contained within the internal cavity defined by the body of the gear arrangement and including one or more torque sensing elements, wherein the torque sensing assembly is configured to measure the torque applied by a user to the pedal assembly;
a velocity sensor that detects rotation of a wheel of the apparatus; and
a processor that determines power associated with the applied force to the pedal assembly from the torque measured by the torque sensing assembly and angular velocity information provided by the velocity sensor.

15. The power sensing assembly of claim 14, wherein the one or more torque sensing elements comprises one or more strain gauges.

16. The power sensing assembly of claim 14, further comprising a tubular member having a set of torque sensing elements affixed thereon, and wherein the tubular member is configured to fit over the hub.

17. The power sensing assembly of claim 14, wherein the body of the gear arrangement includes a rear plate that functions in part to define the internal cavity of the gear arrangement, and wherein the torques sensing assembly is configured for engagement with the rear plate.

18. A power sensing assembly for use with an apparatus powered by a user applied force to a pedal assembly and including a gear arrangement for driving a wheel of the apparatus, wherein the gear arrangement includes a freehub, the power sensing assembly comprising:
a torque sensing assembly mounted within an internal cavity defined by the gear arrangement and having a plurality of torque sensing elements in communication therewith, wherein the torque sensing assembly is configured to measure the torque applied by a user to the pedal assembly, wherein the torque sensing assembly is configured for engagement with a rear plate that functions in part to define the internal cavity of a gear arrangement, and wherein the torque sensing assembly comprises a plurality of bending beams secured between the rear plate and the freehub, wherein the plurality of bending beams includes at least one torque sensing element bonded thereto;
a velocity sensor that detects rotation of a wheel of the apparatus; and
a processor that determines power associated with the applied force to the pedal assembly from the torque measured by the torque sensing assembly and angular velocity information provided by the velocity sensor.

19. The power sensing assembly of claim 18, wherein the at least one torque sensing element comprises a strain gauge, and wherein each strain gauge is in communication with an electronics assembly configured to process the measured torque.

20. A bicycle wheel, comprising:
a rim;
an inner hub area;
a drive gear arrangement drivingly interconnected with the inner hub area, wherein the drive gear arrangement includes an internal cavity; and
a torque sensing arrangement positioned within the internal cavity of the drive gear arrangement for measuring torque applied by a user to the drive gear arrangement;
wherein the drive gear arrangement comprises a hollow cassette defining the internal cavity, wherein the torque sensing arrangement is positioned within the cavity of the hollow cassette, and wherein the hollow cassette includes a series of concentric external gears.

21. The bicycle wheel of claim 20, wherein the torque sensing arrangement includes at least one torque sensing element.

22. The bicycle wheel of claim 21, wherein the torque sensing element is interconnected between the inner hub area and a rear wall of the hollow cassette, wherein the rear wall at least in part defines the internal cavity of the hollow cassette.

* * * * *